United States Patent [19]

Matsuoka

[11] Patent Number: 4,470,556

[45] Date of Patent: Sep. 11, 1984

[54] SEAT BELT RETRACTOR WITH EMERGENCY LOCKING MECHANISM FOR AUTOMOTIVE VEHICLE OR ANOTHER VEHICLE

[75] Inventor: Hideoki Matsuoka, Yokohama, Japan

[73] Assignee: Nissan Motor Company, Limited, Yokohama, Japan

[21] Appl. No.: 270,625

[22] Filed: Jun. 4, 1981

[30] Foreign Application Priority Data

Jun. 6, 1980 [JP] Japan .............................. 55-79475[U]

[51] Int. Cl.³ ........................ A62B 35/02; B65H 75/48
[52] U.S. Cl. ............................................. 242/107.4 A
[58] Field of Search ................. 242/107.4 R–107.4 E; 280/806, 807, 808, 803; 297/478

[56] References Cited

U.S. PATENT DOCUMENTS

| | | | |
|---|---|---|---|
| 2,825,581 | 3/1958 | Knight | 242/107.4 A X |
| 3,220,668 | 11/1965 | Martin | 242/107.4 A |
| 3,838,831 | 10/1974 | Bell | 242/107.4 A |
| 3,985,788 | 12/1976 | Stephenson et al. | 242/107.4 A |
| 4,065,070 | 12/1977 | Pilarski et al. | 242/107.4 A |
| 4,135,683 | 1/1979 | Stephenson et al. | 242/107.4 A |
| 4,164,336 | 8/1979 | Higbee et al. | 242/107.4 A |
| 4,235,391 | 11/1980 | Steger | 242/107.4 A |
| 4,241,886 | 12/1980 | Maekawa et al. | 242/107.4 A X |
| 4,245,798 | 1/1981 | Steger | 242/107.4 A |
| 4,303,209 | 12/1981 | Stephenson | 242/107.4 A |

FOREIGN PATENT DOCUMENTS 2515085 10/1978 Fed. Rep. of Germany .
2012559 1/1979 United Kingdom .

Primary Examiner—John M. Jillions
Attorney, Agent, or Firm—Schwartz, Jeffery, Schwaab, Mack, Blumenthal & Koch

[57] ABSTRACT

A vehicle seat belt retractor having an emergency locking mechanism of two seat belts is disclosed. There is provided a seat belt retractor with an emergency locking mechanism which comprises: a common U-shaped housing; a pair of seat belt retracting shafts, each having one end journalled on one plate of the common U-shaped housing and the other end connected with a return spring for biasing the retracting shaft to retract the corresponding seat belt; a pair of ratchet wheels each fixed to one end of the corresponding seat belt retracting shaft; an inertia sensor, mounted within said common U-shaped housing, for operatively detecting and signalling by displacement when the vehicle's inertia force exceeds a predetermined value; a lock pawl mechanism mounted within said common U-shaped housing and biased away from engagement with the ratchet wheels by means of a fixing means located at one plate of the common U-shaped housing; and an actuating lever rotatably fixed on the common U-shaped housing for actuating the lock pawl mechanism to simultaneously engage with both ratchet wheels when the inertia sensor detects and signals the vehicle's inertia force exceeding the predetermined value.

1 Claim, 9 Drawing Figures

4,470,556

SEAT BELT RETRACTOR WITH EMERGENCY LOCKING MECHANISM FOR AUTOMOTIVE VEHICLE OR ANOTHER VEHICLE

BACKGROUND OF THE INVENTION (1) Field of the Invention

The present invention relates to a seat belt retractor with an emergency locking mechanism. The retractor is for use with an automotive or other vehicle. More particularly the present invention relates to a seat belt retractor having two seat belt retracting shafts with ratchet wheels and a single emergency locking mechanism whereby both seat belt retracting shafts can be locked simultaneously in case of emergency.

(2) Statement of the Prior Art

In a conventional seat belt retractor with an emergency locking mechanism, a seat belt is normally wound on a retracting shaft, biased in the retract direction on the shaft by means of a return spring attached to the shaft.

With conventional retractors when an automotive vehicle collides with an object, an inertia sensor in the form of a weight swings and a flat head supporting the weight tilts due to the vehicle's inertia force. The inclination of the flat head causes an angular movement of an actuating means to push against a lock pawl. Consequently, the lock pawl, provided beside a ratchet wheel attached to the retracting shaft, engages the rotating ratchet wheel, thus locking the movement of the retracting shaft.

However, in the construction of such conventional seat belt retractors, two seat belt retractors for two seat belts need to be provided when each seat belt is spooled out separately from a space between two parallel seats. Therefore, two inertia sensors are required for locking the rotational movements of the seat belt retracting shafts. Consequently, the construction of such conventional seat belt retractors requires more space and is uneconomical.

SUMMARY OF THE INVENTION

With the above-described problem in mind, it is an object of the present invention to provide a seat belt retractor with an emergency locking mechanism for two seat belts, wherein two seat belts can be retracted or spooled out separately from a pair of seat belt retracting shafts, respectively, and the emergency locking mechanism comprises a single inertia sensor, an actuating lever, one arm of which is in contact with the inertia sensor, and a lock pawl mechanism in contact with another arm of the actuating lever for engaging both ratchet wheels simultaneously.

BRIEF DESCRIPTION OF THE DRAWINGS

The features and advantages of the present invention will be clearly understood from the following description taken in conjunction with the accompanying drawings, in which.

DESCRIPTION OF THE PREFERRED EMBODIMENTS

Reference will now be made to the drawings from FIG. 1 to FIG. 9.

Figure 1:
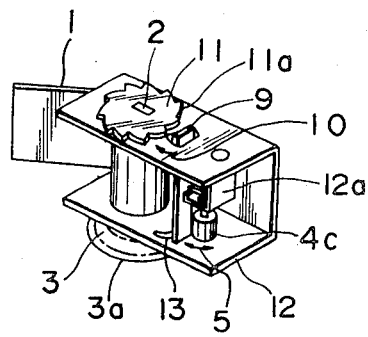
FIG. 1 shows a perspective view of a conventional seat belt retractor.
Figure 2:
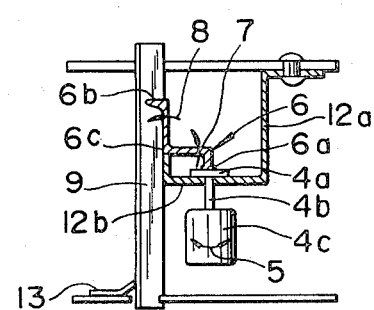
FIG. 2 shows a side view partly in section of the conventional seat belt retractor shown in FIG. 1.
Figure 3:
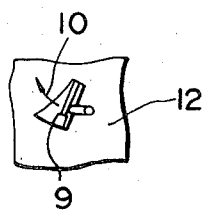
FIG. 3 shows an explanatory view of a lock pawl of the conventional seat belt retractor shown in FIGS. 1 and 2.

FIGS. 1 through 3, show a conventional seat belt retractor with an emergency locking mechanism. As shown in FIG. 1, a seat belt 1 is retracted on a seat belt retracting shaft 2 and biased in the direction to be retracted on the shaft 2 by means of a return spring 3 such as spiral spring housed in a casing 3a located at the bottom of a U-shaped housing 12.

In such conventional seat belt retractors with emergency locking mechanism, when for example, an automotive vehicle in which the retractor is mounted collides with an object, an inertia sensor tiltably supported by plate 12a and comprising a disc-shaped head 4a, supporting rod 4b, and weight 4c as shown clearly in FIG. 2 swings in either direction indicated by an arrow 5 in FIG. 2. Thereupon, a flat end arm 6a touching the disc-shaped head 4a of a lock pawl actuating lever 6 tilts upward as shown by an arrow 7 in FIG. 2. At the same time, an edge portion 6b of the lock pawl actuating lever 6 turns about a supporting axle 6c thereof as indicated by an arrow 8 to push against an elongated lock pawl 9 extending from the lower plate of the U-shaped housing 12 and through a sector hole provided on the upper plate thereof in a direction indicated by an arrow 10 shown in FIGS. 1 and 3 so as to engage with a tooth 11a of the ratchet wheel 11.

In FIGS. 1 and 2, numeral 13 denotes an elastic means such as flat spring, with relatively weak spring pressure, located at the lower plate of the U-shaped housing 12 for biasing the lock pawl 9 so that the lock pawl 9 is not engaged with one of teeth 11a of the ratchet wheel 11 in the normal state.

The normal state indicates the elongated lock pawl 9 is not pushed sufficiently by the actuating lever 6 to engage one of the teeth 11a of the ratchet wheel 11.

However, in the conventional seat belt retractor with the locking mechanism a separate seat belt retractor having a locking mechanism must be provided for each seat belt where a seat belt is provided for each of two (or more) parallel seats. Consequently, two inertia sensors are required, one for each seat belt retractor. This requires additional space and substantially doubled cost.

A seat belt retractor with an emergency locking mechanism of a first preferred embodiment according to the present invention will now be described.

Figure 4:
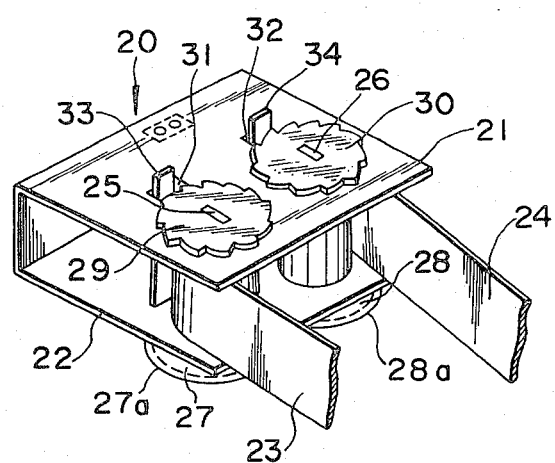
FIG. 4 shows a perspective view of a first preferred embodiment of a seat belt retractor with an emergency locking mechanism according to the present invention.

As shown in FIG. 4, a pair of parallel retracting shafts 25 and 26 biased so as to retract a pair of seat belts 23 and 24 by means of respective self-return springs 27 and 28 housed respectively in casings 27a and 28a on each retracting shaft 25 and 26, are journalled on a common housing 20 having a U-shaped cross section and rectangular upper and lower plates 21 and 22. The upper ends of the retracting shafts are fixed with a pair of ratchet wheels 29 and 30, respectively.

A pair of lock pawls 33 and 34, each preferably having a rectangular shape adapted to engage the ratchet wheels 29 and 30 are inserted through a pair of sector holes 31 and 32 provided at portions adjacent to the ratchet wheels 29 and 30, respectively. Each lock pawl 33 and 34 is biased away from engagement with the teeth of corresponding ratchet wheels 29 and 30, respectively.

Figure 5:
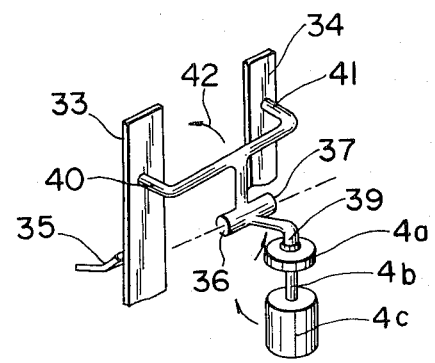
FIG. 5 shows a perspective view of an inertia sensor and locking mechanism of the first preferred embodiment according to the present invention shown in FIG. 4.

FIG. 5 illustrates the interrelation of a locking mechanism with inertia sensor of the first preferred embodiment shown in FIG. 4. In FIG. 5, an actuating lever 37 is pivotally fixed on an axle 36 fixed between the upper and lower plates 21 and 22 of the common U-shaped housing 20. The actuating lever 37 has a first arm 39 whose end is in contact with an inertia sensor of the same construction as shown in FIG. 2 and second arms 40 and 41 each end in contact with one of two elongated lock pawls 33 and 34. The inertia sensor comprises a suspending head 4c, a supporting rod 4b, and weight 4a in the same construction as shown in FIG. 2.

In FIGS. 4 and 5, in a normal state the lock pawls 33 and 34 biased away from engagement with the ratchet wheels 29 and 30 by means of one or more flat springs 35 provided for the lock pawls 33 and 34. The seat belts 23 and 24 can, therefore, be independently spooled out against the of each return springs 27 and 28 or independently retracted by means of the thereof. On the other hand, when the vehicle collides with an object, the weight 4c swings in a certain direction, actuating lever 37 tilts via the first arm 39 toward a direction shown by an arrow 42 in FIG. 5 so that lock pawls 33 and 34 are actuated via the arms 40 and 41, respectively. Consequently, lock pawls 33 and 34 are made within sector holes 31 and 32 to engage with the corresponding ratchet wheel 29 and 30, respectively. Therefore, spooling out of the seat belts 23 and 24 is prevented.

Figure 6:
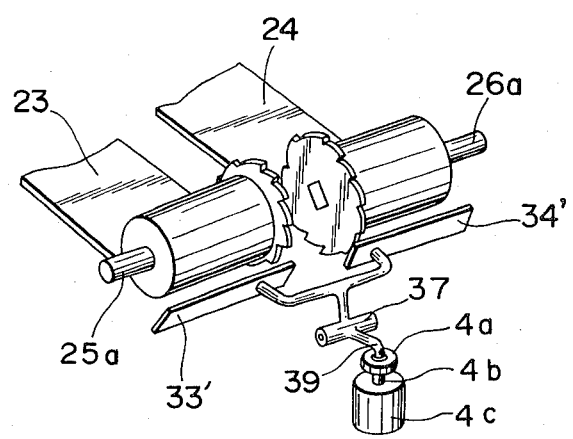
FIG. 6 shows a perspective view of an essential section of a second preferred embodiment according to the present invention.

FIG. 6 illustrates a second preferred embodiment according to the present invention. In this embodiment shown in FIG. 6, the retracting shafts 25a and 26a are disposed in the same axial direction. Lock pawls 33' and 34' are, therefore, disposed in the same direction as the axis of retracting shafts 25a and 26a. The locking operation is the same as that described above for the first preferred embodiment shown in FIGS. 4 and 5.

Figure 7:
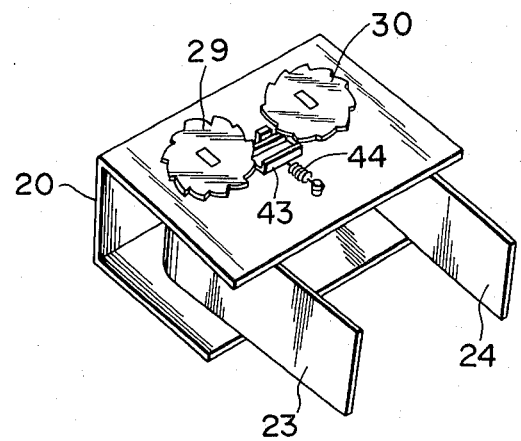
FIG. 7 shows a perspective view of a third preferred embodiment according to the present invention.
Figure 8:
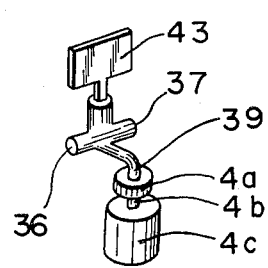
FIG. 8 shows a perspective view of an inertia sensor and locking mechanism of the third preferred embodiment.
Figure 9:
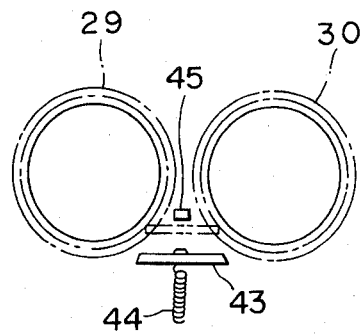
FIG. 9 shows a top view of the seat belt retractor of the third preferred embodiment to explain how a lock pawl is engaged with both ratchet wheels.

FIGS. 7, 8 and 9 show a third preferred embodiment according to the present invention, where a single lock pawl can engage with both ratchet wheels simultaneously. In this embodiment, a flat plate lock pawl 43 attached to an arm of the actuating lever 37 is disposed in a space between ratchet wheels 29 and 30. The lock pawl 43 is biased so as to disengage ratchet wheels 29 and 30 in the normal state by means of an elastic means, e.g., a single helical spring 44. Numeral 45 denotes a stopper means for receiving a stopping force applied to the lock pawl 43 when the lock pawl 43 is actuated to lock the ratchet wheels 29 and 30. For example, when the vehicle collides with an object, the weight 4c swings to tilt the actuating lever 37 upward to actuate the lock pawl 43 so as to lock ratchet wheels 29 and 30 simultaneously.

In the first, second, and third preferred embodiments, the pendulum type inertia sensor 4c is used. As an alternative, another type of inertia sensor may be used. In addition, as described hereinabove the actuating lever actuates the lock pawl(s) directly. However, it should be appreciated that lock pawl(s) may be actuated indirectly or in synchronous form.

According to the present invention, there is provided a seat belt retractor with an emergency locking mechanism wherein a common housing for two seat belt retracting shafts and a locking mechanism having a single inertia sensor and, in the case of the embodiment of FIGS. 7-9, a single lock pawl constituting the locking mechanism. Therefore, the space and cost of the seat belt retractor can be reduced remarkably and vehicle compartment space can be saved.

It will be understood by those skilled in the art that the foregoing description is in terms of preferred embodiments of the present invention wherein various changes and modifications may be made without departing from the spirit and scope of the present invention, which is to be defined by the appended claims.

What is claimed is:

1. A vehicle safety seat belt retractor, comprising:
  (a) a common housing adapted to be positioned between two vehicle seats;
  (b) a pair of seat belt retracting shafts journaled on said common housing;
  (c) a pair of return springs each fixed on a corresponding retracting shaft at one end thereof for biasing said retracting shaft to retract an associated seat belt thereonto;
  (d) a pair of ratchet wheels, each fixed on one of said corresponding retracting shafts at another end thereof outside said housing, said ratchet wheels having teeth thereon facing each other toward an unspooling direction of the seat belts, said ratchet wheels being juxtaposed and said common housing being provided with a single opening intermediate said pair of juxtaposed ratchet wheels;
  (e) an inertia sensor having a flat head and a weight supported by said flat head by means of a rod, said inertia sensor being suspendedly mounted within said common housing so that said flat head tilts when the vehicle inertia force exceeds a predetermined value;
  (f) a lock pawl mechanism mounted within said common housing and comprising a first elongated arm, an upper end thereof extended through said single opening of said common housing and a lower end thereof being pivotally connected to said common housing, and a second elongated arm connected to said first elongated arm in a substantially L-shaped form with each other and being in contact with said flat head of said inertia sensor, said first and second arms being commonly pivotally connected to said common housing so as to transmit the tilt movement of said flat head of said inertia sensor to the upper end of said first elongated arm;
  (g) resilient means fixed to said common housing and connected to said upper end of said first elongated arm at a substantially right angle thereto for biasing said first arm toward one end of said single opening of said common housing so that said first elongated arm is biased out of engagement with the teeth of the ratchet wheels; and
  (h) side edges of said upper end of said first elongted arm each of which is engageable with any one of the teeth of said juxtaposed ratchet wheels in response to the tilt movement of said flat head of said inertia sensor via said second elongated arm.

* * * * *